D. HURLEY.
Car Propeller and Brake.
No. 219,728.  Patented Sept. 16, 1879.
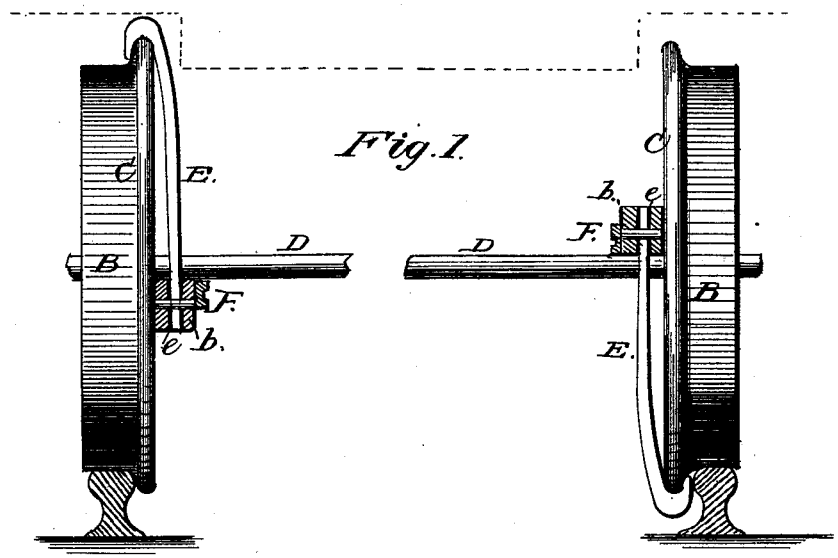
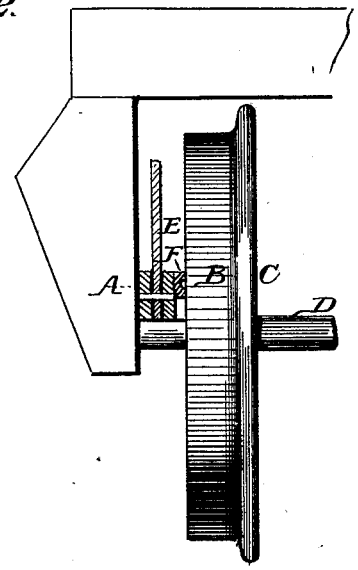
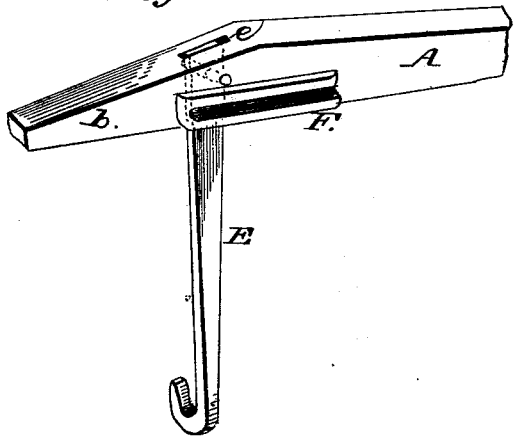
Witnesses
Fred G. Dieterich
Jno. P. Brooks
Inventor
David Hurley.
by DeWitt C. Allen
Attorney

UNITED STATES PATENT OFFICE.

DAVID HURLEY, OF SAYBROOK, ILLINOIS.

IMPROVEMENT IN CAR PROPELLERS AND BRAKES.

Specification forming part of Letters Patent No. 219,728, dated September 16, 1879; application filed August 7, 1879.

*To all whom it may concern:*

Be it known that I, DAVID HURLEY, of Saybrook, in the county of McLean, and in the State of Illinois, have invented certain new and useful Improvements in Car Propellers and Brakes; and do hereby declare that the following is a full, clear, and exact description thereof, reference being had to the accompanying drawings, and to the letters of reference marked thereon, making a part of this specification, and in which—

Figure 1 represents my improvement as applied to the axle of a car-truck and the flanges of the wheel for moving the car forward or backward. Fig. 2 represents my improvement as applied for braking a car. Fig. 3 is a perspective view of my improvement.

This invention relates to certain new and useful improvements in the class of hand implements especially designed for moving cars; and the invention consists, essentially, of a lever provided with a hooked rod or bar pivoted thereto, and extending at right angles with the fulcrumed end or bearing of said lever, to engage with the flange of the wheel.

It further consists in providing said lever with a steel plate secured to one of its sides, whereby the implement can be used as a hand-brake, all as will be hereinafter fully described, and specifically pointed out in the claims.

In the drawings, A represents the lever; B, the car-wheel; C, the flange of said wheel, and D the axle. The lever A has a flat fulcrumed end or bearing, b, and the hooked bar or rod E is pivoted near said fulcrumed end in an inclined slot, e, formed through said lever, the form of the slot limiting the movement of the hooked bar or rod in said lever, said bar or rod extending at right angles thereto, with the hooked end parallel with the lever.

To move a car forward, place flat side of lever nearest the fulcrum upon top of the axle, near the inner side of wheel, and catch the hook upon the flange of the wheel and lift by the lever.

To move a car backward, place flat side of lever nearest the fulcrum upon under side of axle and catch the hook upon the flange of the wheel above the axle, and then bear down upon the lever.

My improvement, as applied for moving cars, possesses great lever-power, and will move heavily-loaded cars backward or forward with the outlay of but little actual strength or power, one man moving a car with perfect ease.

The hooked bar or rod, being pivoted to the lever, as shown, can be pressed forward so as to firmly and securely engage with the flange of the wheel.

The implement has secured to one of its sides, nearest the fulcrumed end of the lever, a steel plate, F, whereby the implement can also be used as a hand-brake.

To use the implement as a brake, place the end of lever nearest the hooked bar or rod between the boxing on end of axle and the wheel, with the metal plate next to the wheel; then draw the metal plate up against the wheel, allowing the wheel to rub hard against it, while the forward or fulcrumed end of the lever presses against the boxing above mentioned.

Having thus fully described my invention, I do not wish to be understood as claiming, broadly, a lever provided with a pivoted hook for moving cars, as I am aware it is old; but

I claim as my invention—

1. The herein-described implement for moving cars, consisting of the lever A, provided with a flat bearing-face, *b*, inclined slot *e*, and hook-shaped rod or bar E, pivoted thereto, and extending at right angles therewith, substantially as specified.

2. The herein-described implement for moving cars, consisting of the lever A and hooked rod or bar E, said lever A provided on one of its sides, near its fulcrumed end, with a steel plate, F, whereby the implement is adapted to be used as a hand-brake, substantially as specified.

In testimony that I claim the foregoing I have hereunto set my hand this 21st day of July, 1879.

DAVID HURLEY.

Witnesses:
H. E. HADLEY,
C. G. BRADSHAW.